(12) United States Patent
Matsuoka

(10) Patent No.: US 9,698,636 B2
(45) Date of Patent: Jul. 4, 2017

(54) BRUSHLESS MOTOR

(71) Applicant: MABUCHI MOTOR CO., LTD., Matsudo, Chiba (JP)

(72) Inventor: Yuuichirou Matsuoka, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 243 days.

(21) Appl. No.: 14/697,735

(22) Filed: Apr. 28, 2015

(65) Prior Publication Data

US 2015/0318745 A1 Nov. 5, 2015

(30) Foreign Application Priority Data

Apr. 30, 2014 (JP) ................. 2014-094086

(51) Int. Cl.
*H02K 1/27* (2006.01)

(52) U.S. Cl.
CPC ....... *H02K 1/2773* (2013.01); *H02K 2213/03* (2013.01)

(58) Field of Classification Search
CPC   H02K 1/14; H02K 1/146; H02K 1/16; H02K 1/22; H02K 1/27; H02K 1/276; H02K 1/2766; H02K 1/277; H02K 1/2773; H02K 1/278; H02K 21/12; H02K 21/14; H02K 21/16; H02K 29/03
USPC ............ 310/156.45, 156.53, 156.55–156.57, 310/216.069, 216.091, 216.092, 216.093, 310/216.111
See application file for complete search history.

(56) References Cited

U.S. PATENT DOCUMENTS

| | | | | |
|---|---|---|---|---|
| 4,700,097 A | * | 10/1987 | Kawada ................. | H02K 21/14 310/156.45 |
| 6,847,149 B2 | * | 1/2005 | De Filippis ............ | H02K 29/03 310/216.008 |
| 2009/0096308 A1 | * | 4/2009 | Staudenmann ...... | H02K 1/2773 310/156.08 |
| 2012/0038237 A1 | * | 2/2012 | Li ......................... | H02K 1/146 310/156.45 |
| 2013/0009506 A1 | * | 1/2013 | Iwakiri ................ | H02K 1/2773 310/156.12 |

(Continued)

FOREIGN PATENT DOCUMENTS

| | | |
|---|---|---|
| JP | 2003-533158 A | 11/2003 |
| JP | 2010-161896 A | 7/2010 |

(Continued)

*Primary Examiner* — Tran Nguyen
(74) *Attorney, Agent, or Firm* — Schwabe Williamson & Wyatt, PC

(57) ABSTRACT

A brushless motor includes: a rotor including a magnet; and a stator including at its center a space for placing the rotor. The rotor includes: a rotor core; and a plurality of magnets. The rotor core includes a plurality of magnet holders radially formed around a rotating shaft. The magnets are housed in the magnet holders such that the same magnetic poles of adjacent magnets face each other in a circumferential direction of the rotor core, and the stator includes a plurality of teeth formed toward the center to face the rotor. Given that a radius of curvature of an outer circumference of the rotor core is R, a width of an end of the teeth in a circumferential direction is W, and a maximum outer diameter of the rotor core is L, $0.9 \leq R/W \leq 4.2$ and $R < L/2$ are met.

16 Claims, 11 Drawing Sheets

(56) References Cited

U.S. PATENT DOCUMENTS

2013/0082561 A1* 4/2013 Mantovani ............. H02K 21/12
                                                            310/156.38
2013/0119811 A1* 5/2013 Kobayashi ............... H02K 1/02
                                                            310/156.53
2013/0313932 A1* 11/2013 Shibata ................ H02K 1/2773
                                                            310/156.07

FOREIGN PATENT DOCUMENTS

JP          2012-517209 A      7/2012
JP           2013106388 A   *  5/2013    ............. H02K 1/277

* cited by examiner

BRUSHLESS MOTOR

CROSS-REFERENCE TO RELATED APPLICATIONS

This application is based upon and claims the benefit of priority from the prior Japanese Patent Application No. 2014-094086, filed on Apr. 30, 2014, the entire content of which is incorporated herein by reference.

BACKGROUND OF THE INVENTION

1. Field of the Invention

The present invention relates to a brushless motor.

2. Description of the Related Art

In the conventional practice, motors are used as driving sources of various types of apparatuses and products. For example, the motors are used for business machines, such as printers and copying machines, various kinds of home electric appliances, and power assist sources of vehicles, such as automobiles and power-assisted bicycles. In particular, brushless motors are sometimes used as the driving sources of movable parts with high operation frequency in the light of increased durability and reduced noise.

Known as a type of such a brushless motor is an interior permanent magnet (IPM) motor where a permanent magnet is embedded in a rotor. For example, electric appliances are known in which a plurality of plate-like magnets are radially embedded in a rotor yoke and the magnets are disposed such that the same poles of adjacent magnets face each other in a circumferential direction of the yoke (see, for example, FIG. 2 of patent document 1).

[patent document 1] Japanese Translation of PCT International Application Publication No. JP2012-517209

One of the methods to improve a rotational torque of an interior permanent magnet brushless motor without increasing the motor size is to reduce the distance between the rotor and the stator. However, such an approach tends to result in increase in torque ripple and noise.

SUMMARY OF THE INVENTION

The present invention addresses the issue and a purpose thereof is to provide a brushless motor in which the torque is prevented from being reduced and the torque ripple and noise are reduced at the same time.

The brushless motor according to an embodiment of the present invention includes: a rotor including a magnet; and a stator including at its center a space for placing the rotor. The rotor includes: a rotor core; and a plurality of magnets. The rotor core includes a plurality of magnet holders radially formed around a rotating shaft. The magnets are housed in the magnet holders such that the same magnetic poles of adjacent magnets face each other in a circumferential direction of the rotor core, and the stator includes a plurality of teeth formed toward the center to face the rotor. Given that a radius of curvature of an outer circumference of the rotor core is R, a width of an end of the teeth in a circumferential direction is W, and a maximum outer diameter of the rotor core is L, $0.9 \le R/W \le 4.2$ and $R<L/2$ are met.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
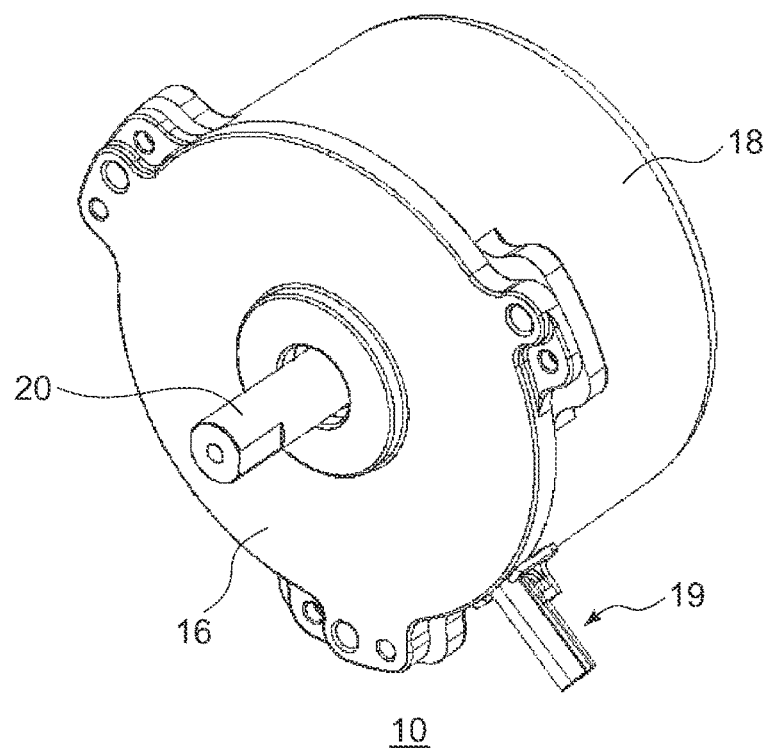
FIG. 1 is an overall perspective view of a brushless motor according to the embodiment.

The invention will now be described by reference to the preferred embodiments. This does not intend to limit the scope of the present invention, but to exemplify the invention.

The brushless motor according to an embodiment of the present invention includes a rotor including a magnet, and a stator including at its center a space for placing the rotor. The rotor includes a rotor core and a plurality of magnets. The rotor core includes a plurality of magnet holders radially formed around the rotating shaft. The magnets are housed in the magnet holders such that the same magnetic poles of adjacent magnets face each other in a circumferential direction of the rotor core. The stator includes a plurality of teeth formed toward the center to face the rotor. Given that the radius of curvature of the outer circumference of the rotor core is R, the width of the end of the teeth in the circumferential direction is W, and the maximum outer diameter of the rotor core is L, $0.9 \le R/W \le 4.2$ and $R<L/2$ are met.

According to the embodiment, generation of torque ripple or noise is reduced.

Given that the maximum outer diameter of the rotor is L and the width of the magnet in the radial direction is Y, $0.37 \le Y/(L/2) \le 0.62$ may be met. This further reduces generation of torque ripple or noise.

Another embodiment of the present invention also relates to a brushless motor. The brushless motor includes a rotor including a magnet, and a stator including at its center a space for placing the rotor. The rotor includes a rotor core and a plurality of magnets. The rotor core includes a plurality of magnet holders radially formed around the rotating shaft. The magnets are housed in the magnet holders such that the same magnetic poles of adjacent magnets face each other in a circumferential direction of the rotor core. Given that the maximum outer diameter of the rotor is L and the width of the magnets in the radial direction is Y, $0.37 \leq Y/(L/2) \leq 0.62$ is met.

According to the embodiment, generation of torque ripple or noise is reduced.

The gap between the rotor and the stator may be 0.3-1.5 mm. This prevents the torque from being reduced and reduces the torque ripple and noise at the same time.

The rotor core may further include an annular part around a hole in which the rotating shaft is inserted, a plurality of magnetic pole pieces radially formed around the annular part, and a plurality of first magnetic flux blocking parts formed outside the annular part and in respective areas between adjacent magnet holders. The magnet holder may include a second magnetic flux blocking part at an end of the magnet holder toward the rotating shaft. The magnets may be housed in the magnet holders such that the same magnetic poles of adjacent magnets face each other in a circumferential direction of the rotor core. The first magnetic flux blocking part and the second magnetic flux blocking part may be configured to restrain a short circuit, within the rotor core, of the magnetic flux emanating from the magnet. The rotor core may include two magnetic paths formed between the first magnetic flux blocking part and two second magnetic flux blocking parts adjacent to the first magnetic flux blocking part. The two magnetic paths may branch toward the annular part in different directions from the end of the magnetic pole piece toward the rotating shaft.

The two magnetic paths may be provided in linear symmetry with respect to the center line of the magnetic pole piece. This ensures that the force that supports the magnetic pole piece remains unchanged regardless of whether the rotor is rotated clockwise or counterclockwise.

The first magnetic flux blocking part and the second magnetic flux blocking part may be configured such that the angle α formed by the straight line L1 through the center of the magnetic path and the central line L2 of the magnetic pole piece is larger than 0°, and the angle β formed by the straight line L1 through the magnetic path and the plane P1 including the end face of the magnet toward the rotating shaft is larger than 10°. This allows the first magnetic flux blocking part and the second magnetic flux blocking part to have a proper size.

The second magnetic flux blocking part may be a through hole extending in the direction of the rotating shaft and may be provided with a function of positioning the magnet in the radial direction. The circumferential width of the area of the second magnetic flux blocking part adjacent to the magnet is smaller than the circumferential width of the magnet housed in the magnet holder. In this way, the short circuit flux is reduced by using a simple structure. Further, it is not necessary to configure the second magnetic flux blocking part to have a special form for the purpose of positioning the magnet in the radial direction.

The first magnetic flux blocking part may be a through hole extending in the direction of the rotating shaft. In this way, the short circuit flux is reduced by using a simple structure.

The outer circumference of the magnetic pole piece may be isolated from the adjacent magnetic pole piece. This reduces the short circuit flux in the vicinity of the outer circumferential end face of the magnet.

Optional combinations of the aforementioned constituting elements, and implementations of the invention in the form of methods, apparatuses, and systems may also be practiced as additional modes of the present invention. According to the embodiment described above, there is provided a brushless motor in which the torque is prevented from being reduced and the torque ripple and noise are reduced at the same time.

A description will be given of an embodiment of the present invention with reference to the drawings. Like numerals represent like elements so that the description will be omitted accordingly. The structures described hereinbelow are only exemplary and does not limit the scope of the present invention. A brushless motor of inner rotor type is described below by way of an example.

Figure 2:
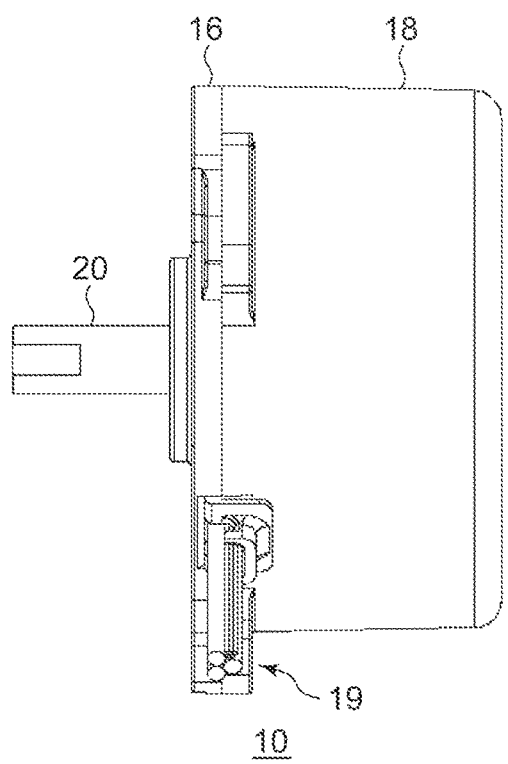
FIG. 2 is a lateral view of the brushless motor according to the embodiment.
Figure 3:
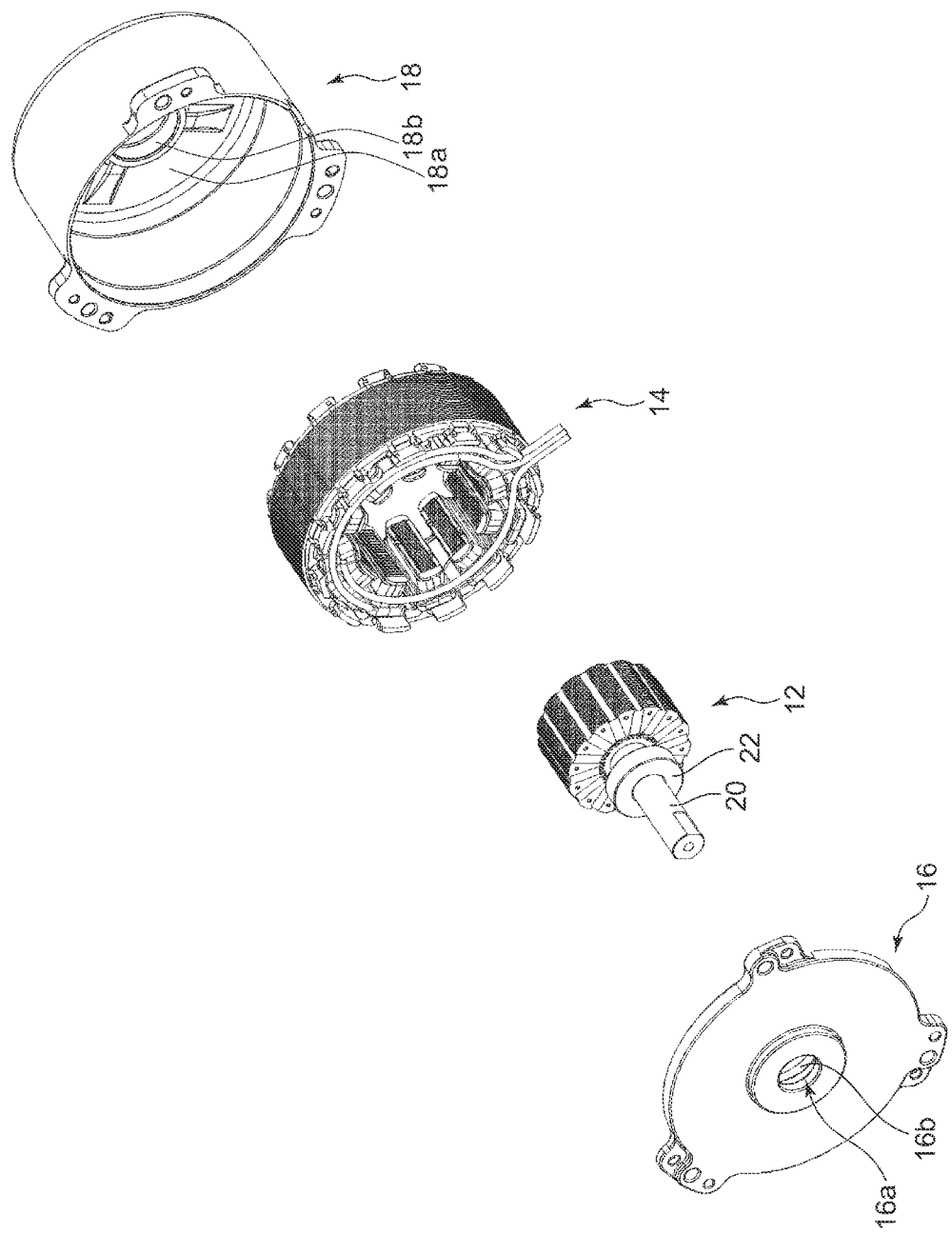
FIG. 3 is an exploded perspective view of the brushless motor according to the embodiment.

(Brushless motor) FIG. 1 is an overall perspective view of a brushless motor according to the embodiment. FIG. 2 is a lateral view of the brushless motor according to the embodiment. FIG. 3 is an exploded perspective view of the brushless motor according to the embodiment.

The brushless motor (hereinafter, sometimes referred to as "motor") 10 according to the embodiment includes a columnar rotor 12 including a magnet, a stator 14 including at its center a space for placing the rotor 12, a front bell 16, a housing body 18, and a power feeder 19.

The front bell 16, which is a plate-shaped member, is formed with a hole 16a at the center so that a rotating shaft 20 can penetrate therethrough, and is formed with a recess 16b near the hole 16a to hold a bearing 22. The front bell 16 supports a portion of the rotating shaft 20 of the rotor 12 via the bearing 22. The housing body 18 is a cylindrical member. A recess 18b for supporting the bearing (not shown) is formed at the center of a base 18a. The housing body 18 supports another portion of the rotating shaft 20 of the rotor 12 via the bearing. In the present embodiment, the front bell 16 and the housing body 18 constitute a housing member for housing the rotor 12 and the stator 14.

(Rotor)

Figure 4A:
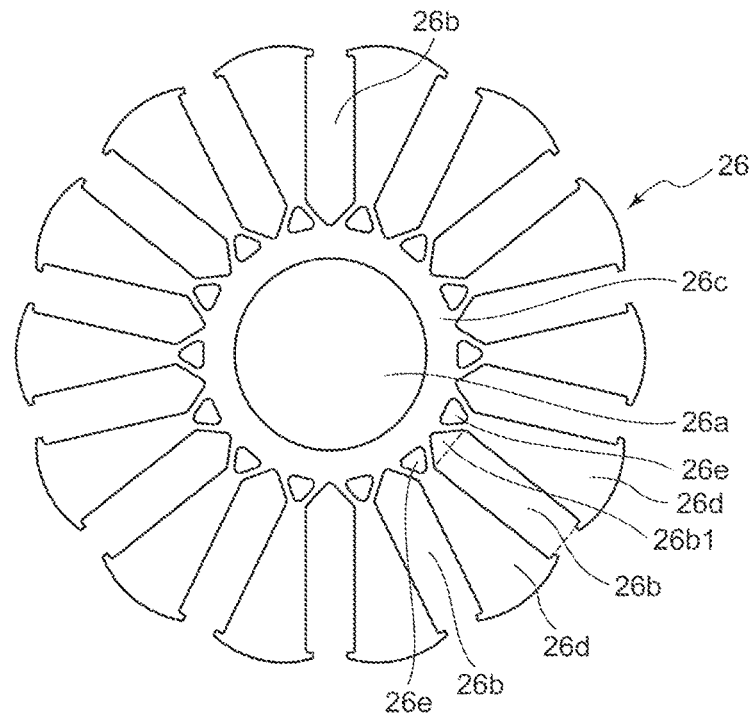
FIG. 4A is a top view of the rotor core according to the embodiment.
Figure 4B:
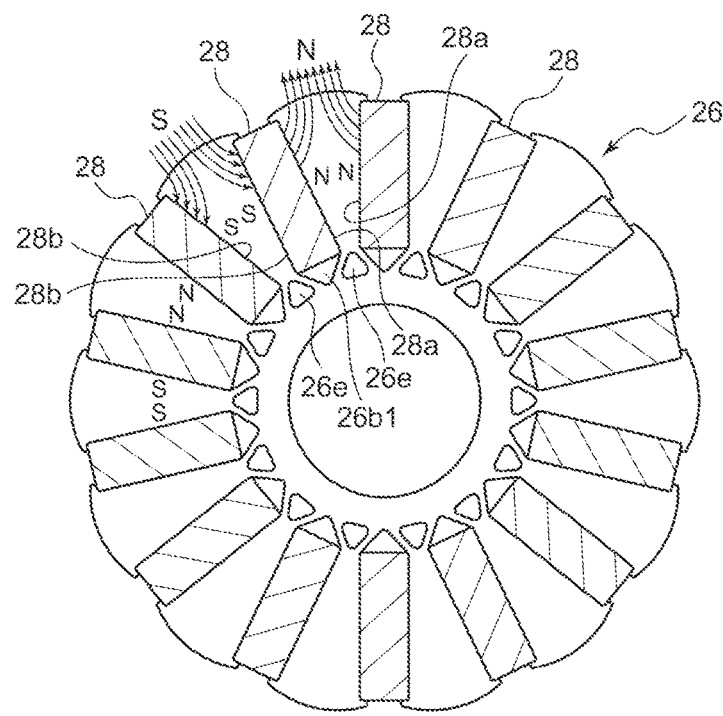
FIG. 4B is a top view showing how the magnet is fitted into the rotor core shown in FIG. 4A.

FIG. 4A is a top view of the rotor core according to the embodiment, and FIG. 4B is a top view showing how the magnet is fitted into the rotor core shown in FIG. 4A.

The rotor 12 includes a circular rotor core 26 and a plurality of magnets 28. A through hole 26a, in which the rotating shaft 20 is inserted and fixed, is formed in the center of the rotor core 26. The rotor core 26 further includes an annular part 26c around the through hole 26a in which the rotating shaft 20 is inserted, a plurality of fan-shaped magnetic pole pieces 26d radially formed around the annular part 26c, a plurality of magnet holders 26b radially formed between two adjacent magnetic pole pieces 26d, and a plurality of first magnetic flux blocking parts 26e formed outside the annular part 26c.

The magnet 28 is inserted into the magnet holder 26b and fixed therein. The magnet 28 is a members of a plate shape conforming to the shape of the magnet holder 26b.

The members described above are assembled in sequence. More specifically, a plurality (i.e., fourteen) of magnets 28 are fitted into the corresponding magnet holders 26b, and the rotating shaft 20 is inserted into the through hole 26a of the rotor core 26. The bearing 22 is then mounted to the rotating shaft 20.

(Rotor Core)

In the rotor core 26 shown in FIG. 4A, a plurality of plate-shaped members are laminated. Each of the plurality of plate-shaped members is manufactured such that a nonoriented electromagnetic steel sheet (e.g., silicon steel sheet) is stamped out into a predetermined shape, as shown in FIG. 4A, by press-forming. Then the magnet holders 26b are radially formed around the rotating shaft of the rotor core 26.

As shown in FIG. 4B, the magnets 28 are housed in the magnet holders 26b such that the same magnetic poles of adjacent magnets face each other in the circumferential direction of the rotor core 26. In other words, the magnets 28 are configured such that principal surfaces 28a and 28b, whose surface areas are largest among the six surfaces of each of the adjacent magnets 28 that are approximately rectangular parallelepipeds, are an N-pole and an S-pole, respectively. Thus, the lines of magnetic force emanating from the principal surface 28a of the magnet 28 are directed outward of the rotor core 26 from an area between the two adjacent magnets 28. As a result, the rotor 12 according to the present embodiment functions as fourteen magnets such that seven N-poles and seven S-poles are alternately formed on the outer circumferential of the rotor 12.

The magnet 28 is a bonded magnet, a sintered magnet or the like, for instance. The bonded magnet is a magnet formed such that a magnetic material is kneaded with a rubber or resin material and then the resulting material undergoes injection molding or compression molding. Where the bonded magnet is used, a high-precision C face (inclined plane) or R face is obtained without having to undergo any postprocessing. On the other hand, the sintered magnet is a magnet formed such that powered magnetic materials are sintered at high temperature. The sintered magnet is more likely to improve the residual magnetic flux density than the bonded magnet is. However, in order to have a high-precision C face or R face, the postprocessing is often required.

The magnet holder 26b according to the embodiment is provided with a second magnetic flux blocking part 26b1 at the end of the magnet holder 26b toward the rotating shaft 20 (through hole 26a). The aforementioned first magnetic flux blocking part 26e is formed between the adjacent second magnetic flux blocking parts 26b1. The first magnetic flux blocking part 26e and the second magnetic flux blocking part 26b1 are configured to restrain a short circuit, within the rotor core 26, of the magnetic flux (lines of magnetic force) emanating from the plate-shaped magnet 28. In other words, the lines of magnetic force emanating from the principal surface 28a of the magnet 28 are prevented from being short-circuited within the rotor core 26 by the first magnetic flux blocking part 26e and the second magnetic flux blocking part 26b1. The area in which the lines of magnetic force pass through is called a magnetic path. The longer the magnetic path, the higher the magnetic resistance and the harder it becomes for the lines of magnetic force to pass through.

Figure 5:
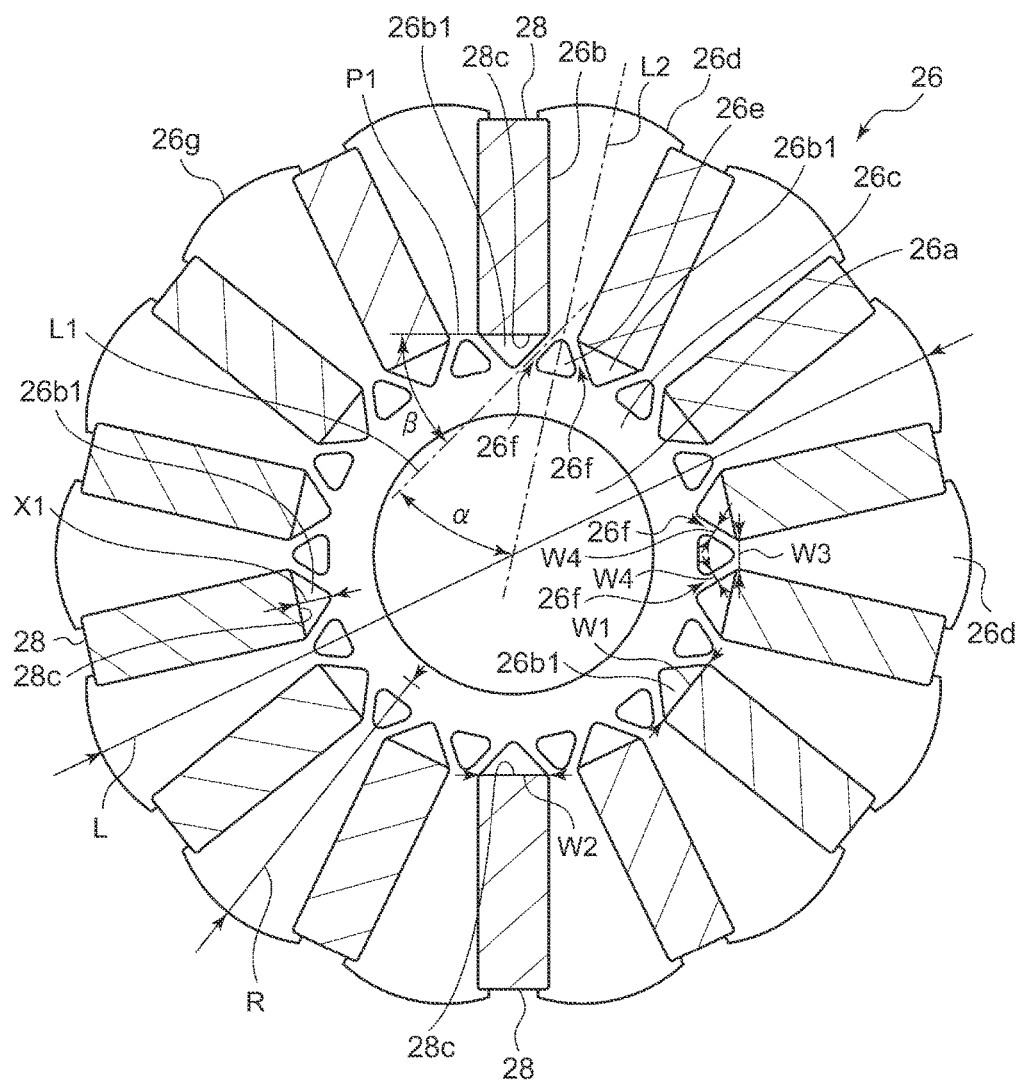
FIG. 5 is a top view of the rotor core showing the magnetic path according to the embodiment.

(Magnetic path) FIG. 5 is a top view of the rotor core showing the magnetic path according to the embodiment. The rotor core 26 according to the embodiment includes two magnetic paths 26f formed between the the first magnetic flux blocking part 26e and the two second magnetic flux blocking part 26b1 adjacent to the first magnetic flux blocking part 26e. The two magnetic paths 26f branch toward the annular part 26c in different directions (i.e., in a Y shape) from the end of the magnetic pole piece 26d toward the through hole 26a.

The first magnetic flux blocking part 26e and the second magnetic flux blocking part 26b1 restrain a short circuit, within the rotor core, of the magnetic flux emanating from the magnet 28. Thus, the rotor according to the embodiment is suitable for a high-torque brushless motor. Since each magnetic pole piece 26d is supported by the two magnetic paths 26f with respect to the annular part 26c, the mechanical strength with which the magnetic pole piece 26d is fixed to the annular part 26c is improved and the displacement of the magnetic pole piece 26d during the rotation of the rotor is reduced. Since the two magnetic paths 26f branch toward the annular part 26c in different directions from the end of the magnetic pole piece 26d toward the through hole 26a, the displacement of the magnetic pole piece 26d in the presence of various external forces (magnetic force and centrifugal force) that differ in the direction of exertion against the magnetic pole piece 26d is effectively reduced.

As shown in FIG. 5, the two magnetic paths 26f according to the embodiment are formed such that the longitudinal directions thereof are different. The two magnetic paths 26f are provided in linear symmetry with respect to the diameter of the rotor core 26. This ensures that the force that supports the magnetic pole piece 26d remains unchanged regardless of whether the rotor 12 is rotated clockwise or counterclockwise.

The first magnetic flux blocking part 26e and the second magnetic flux blocking part 26b1 are configured such that the angle α formed by the straight line L1 through the center of the magnetic path and the central line L2 of the magnetic pole piece 26d is larger than 0°, and the angle β formed by the straight line L1 through the magnetic path and the plane P1 including the end face 28c of the magnet 28 toward the rotating shaft (through hole 26a) is larger than 10°. By setting the angle α to be larger than 0° and the angle β to be larger than 10°, the first magnetic flux blocking part 26e and the second magnetic flux blocking part 26b1 are formed to have a size capable of reducing the short circuit flux. In the rotor core 26 according to the embodiment, the angle α is about 30° and the angle β is about 47°.

The angle α is preferably 15° or larger and, more preferably, 30° or larger. Further, the angle β is preferably 20° or larger and, more preferably, 30° or larger. In this way, the first magnetic flux blocking part 26e and the second magnetic flux blocking part 26b1 are formed to have a size capable of reducing the short circuit flux more successfully.

The first magnetic flux blocking part 26e and the second magnetic flux blocking part 26b1 are triangular through holes extending in the direction of the rotating shaft (direction perpendicular to the surface of the paper). In this way, the short circuit flux is reduced by using a simple structure that is easy to manufacture. The first magnetic flux blocking part 26e may be an equilateral triangle in shape. The first magnetic flux blocking part 26e and the second magnetic flux blocking part 26b1 according to the embodiment are hollow areas filled with air, which has a small magnetic permeability. Alternatively, a substance with a small magnetic permeability may fill the areas. In this case, the intensity of the rotor core 26 as a whole is improved.

The second magnetic flux blocking part 26b1 has the function of positioning the magnet 28 in the radial direction. More specifically, the circumferential width W1 of the area of the second magnetic flux blocking part 26b1 adjacent to the plate-shaped magnet is smaller than the circumferential width W2 of the magnet 28 housed in the magnet holder 26b. Thus, it is not necessary to configure the second magnetic flux blocking part 26b1 to have a special form for the purpose of positioning the magnet 28 in the radial direction. This improves the precision of dimension of the parts produced by stamping out the plate-shaped members of the rotor core 26 by press-forming.

An outer circumference 26g of the magnetic pole piece 26d according to the embodiment is isolated from the adjacent magnetic pole piece 26d. This reduces the short circuit flux in the vicinity of the outer circumferential end face of the magnet 28.

Given that the radius of curvature of the outer circumference 26g of the fan-shaped magnetic pole piece 26d is R and the maximum outer diameter of the rotor core is L, R<L/2 is met. This provides a brushless motor characterized by reduced torque variation and smooth rotation.

The motor 10 according to the embodiment includes the tubular stator 14 provided with a plurality of windings, the aforementioned rotor 12 provided at the center of the stator 14, and the power feeder 19 for feeding power to the plurality of windings of the stator 14. In this way, the average magnetic flux density at the outer circumference of the rotor is increased and the mechanical strength of the rotor is maintained at the same. As a result, a high-torque, high-rigidity, and low-noise brushless motor is realized.

The distance X1 in the second magnetic flux blocking part 26b1 between the end face 28c of the magnet 28 and the annular part 26c of the rotor core 26 is preferably 0.5 mm or greater.

Given that width of the narrowest part at the root of the magnetic pole piece 26d is W3 and the width of each magnetic path 26f is W4, the first magnetic flux blocking part 26e and the second magnetic flux blocking part 26b1 may be configured to meet W3>2×W4. This further makes it difficult for lines of magnetic force emanating from the principal surface of the magnet 28 to pass through the magnetic path and reduces the short circuit flux more successfully.

(Stator)

Figure 6:
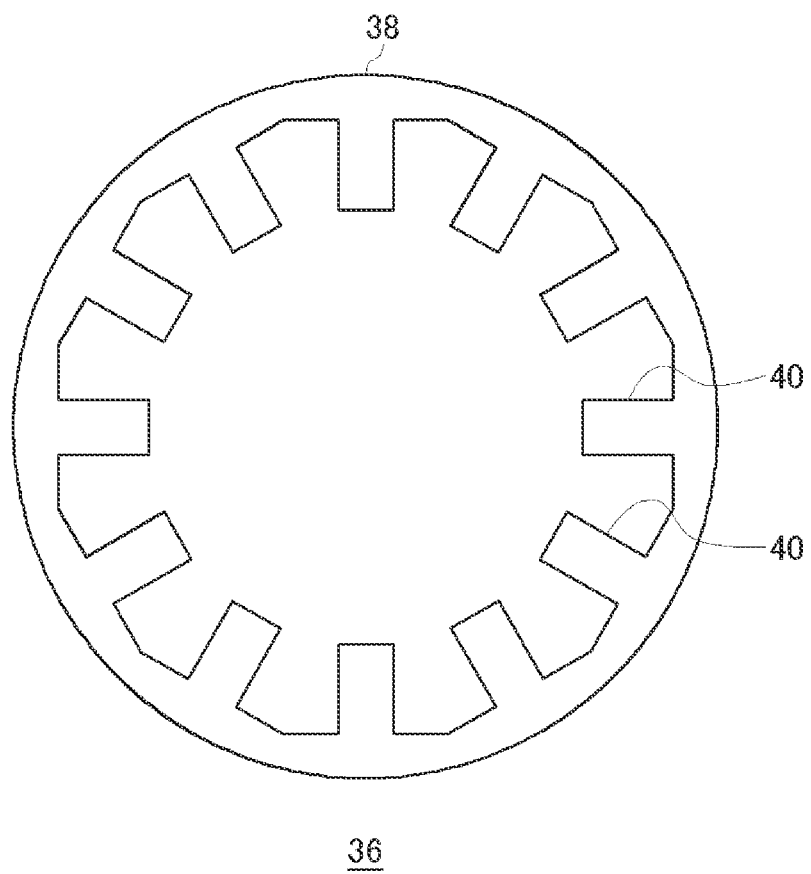
FIG. 6 is a top view of the stator core.

A description will now be given of the structure of the stator 14. FIG. 6 is a top view of the stator core. FIG. 6 shows the shape of the stator core only schematically and the details are omitted.

A stator core 36 is a cylindrical member in which a plurality of plate-shaped stator yokes 38 are laminated. The stator yoke 38 is configured such that a plurality (e.g., twelve in the present embodiment) of teeth 40 are formed to extend from an inner circumference of an annular portion toward the center.

An insulator (not shown) is attached to each of the teeth 40. Then, a conductor is wound around the insulator for each of the teeth 40 so as to form a stator winding (not shown). Then, the rotor 12 is placed at the center of the stator 14 that has been completed through the above processes. If the width of the teeth is configured to be wider toward the tip thereof, a plurality of divided insulators may be attached from top and bottom of the teeth.

A detailed description will now be given of the shapes of the teeth 40 of the stator 14, the rotor core 26, and the magnet 28. After a careful study, we have found that the torque ripple and noise are further reduced by configuring the shapes properly.

Figure 7:
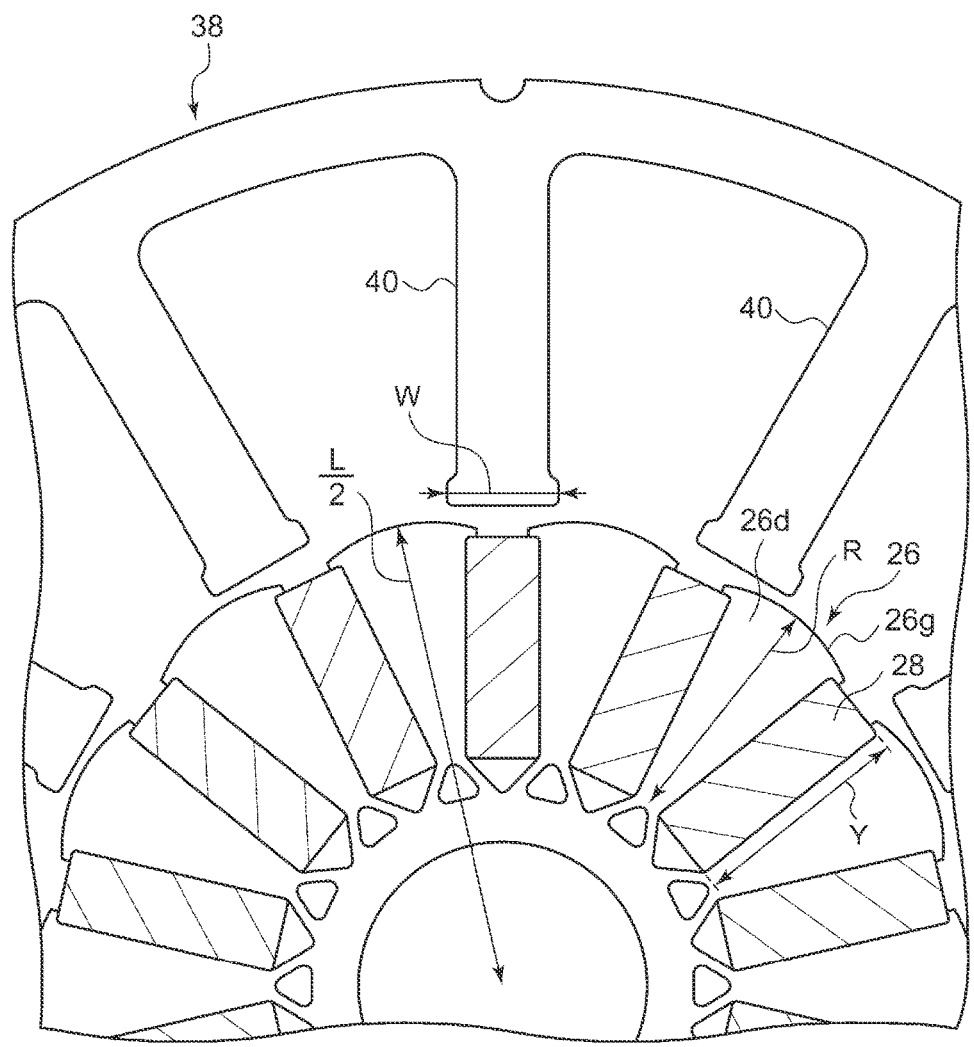
FIG. 7 shows the schematic structure of the rotor and the stator according to the embodiment.
Figure 8:
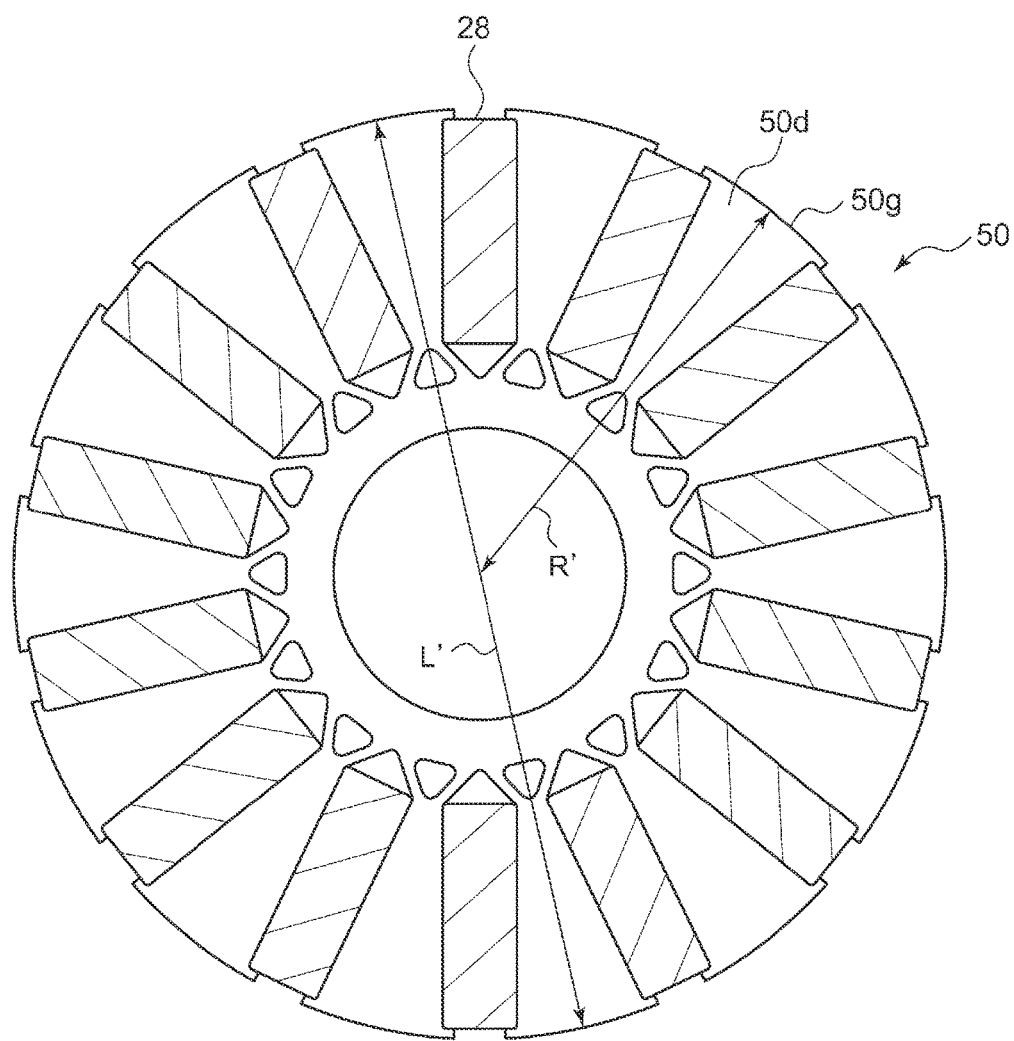
FIG. 8 shows the schematic structure of the rotor according to a comparative example.

FIG. 7 shows the schematic structure of the rotor 12 and the stator 14 according to the embodiment. FIG. 8 shows the schematic structure of the rotor according to a comparative example.

As mentioned above, given that the radius of curvature of the outer circumference 26g of the fan-shaped magnetic pole piece 26d is R and the maximum outer diameter of the rotor core 26 is L, the rotor core 26 of the rotor 12 meets R<L/2. Meanwhile, a rotor core 50 according to the comparative example shown in FIG. 8 is configured such that, given that the radius of curvature of an outer circumference 50g of a fan-shaped magnetic pole piece 50d is R' and the maximum outer diameter of the rotor core 50 is L', R'=L'/2 is met. The waveforms of the induced voltage are measured by assembling the rotor core 26 and the rotor core 50 to the same stator along with other necessary components.

Figure 9:
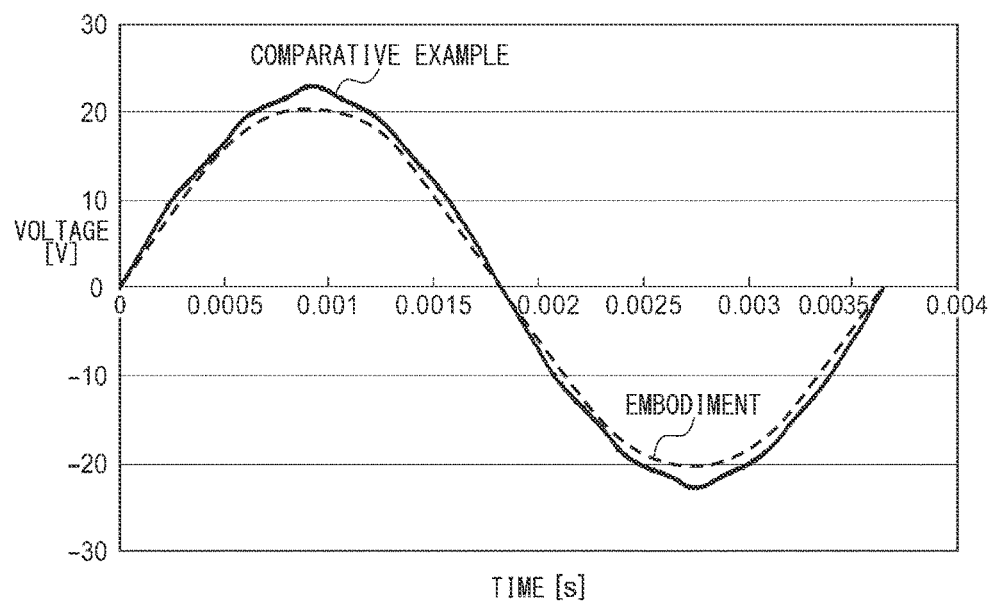
FIG. 9 is a graph showing measurements of the induced voltage obtained by using the rotor core according to the embodiment and that of the comparative example.
Figure 10:
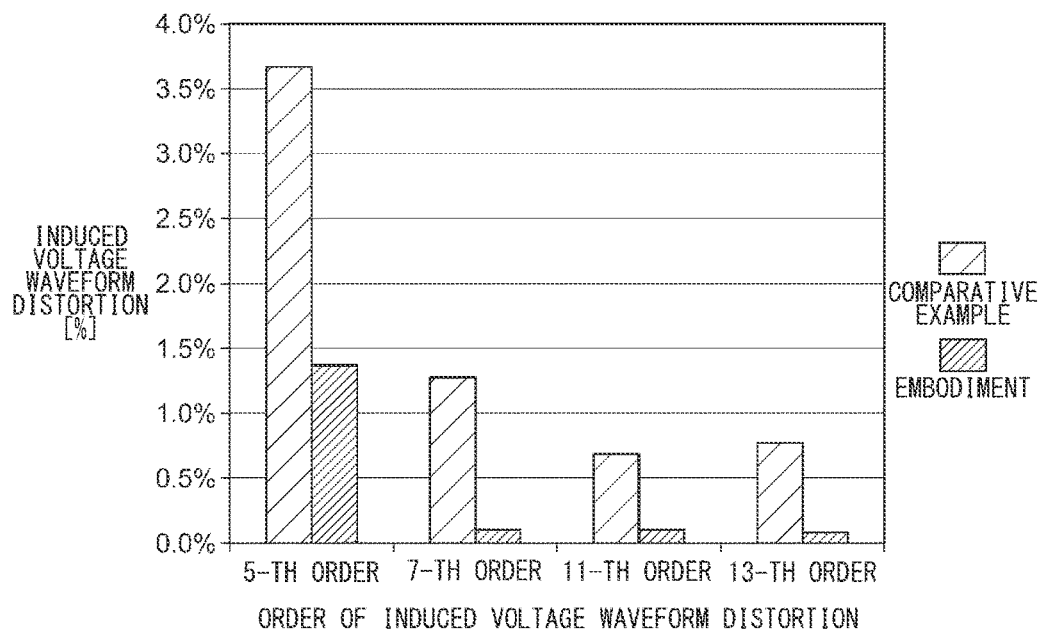
FIG. 10 shows a comparison between the 5-th, 7-th, 11-th, and 13-th order components of the induced voltage waveform distortion obtained by subjecting the waveforms shown in FIG. 9 according to the embodiment and the comparative example to FFT analysis.

FIG. 9 is a graph showing measurements of the induced voltage obtained by using the rotor core according to the embodiment and that of the comparative example. The vertical axis of FIG. 9 represents voltage waveforms relative to each other and the horizontal axis represents time. FIG. 10 shows a comparison between the 5-th, 7-th, 11-th, and 13-th order components of the induced voltage waveform distortion obtained by subjecting the waveforms shown in FIG. 9 according to the embodiment and the comparative example to FFT analysis. The vertical axis of FIG. 10 represents the proportion occupied by the component of each order in the whole order components from FFT analysis.

As shown in FIG. 9, the waveform approaches a sinusoidal wave in the case of the rotor core shape according to the embodiment. In the case of the rotor core shape according to the comparative example, the waveform is distorted from the sinusoidal wave. As shown in FIG. 10, the 5-th order component of the waveform of the voltage induced in the rotor according to the embodiment is 62% less than that of the comparative example, and the 7-th, 11-th, and 13-th order components are 84-91% less than that of the comparative example.

Figure 11A:
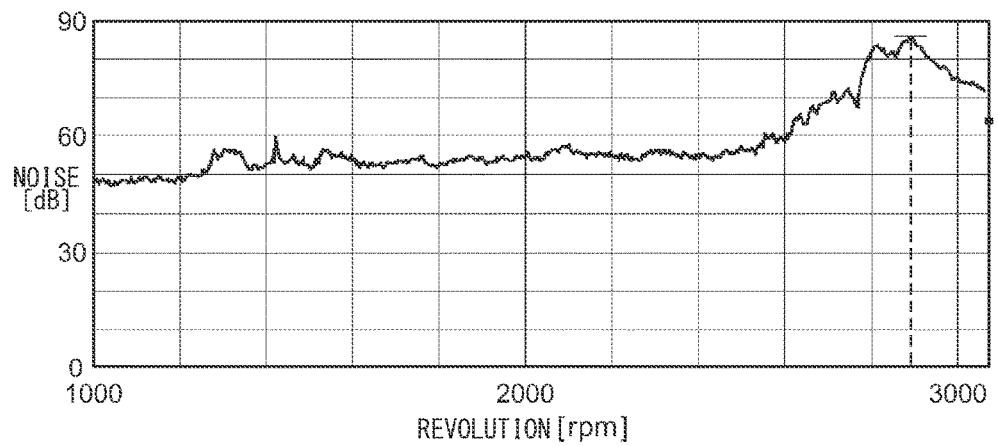
FIG. 11A shows a result of measuring the noise of a motor in which the rotor according to the comparative example is used.
Figure 11B:
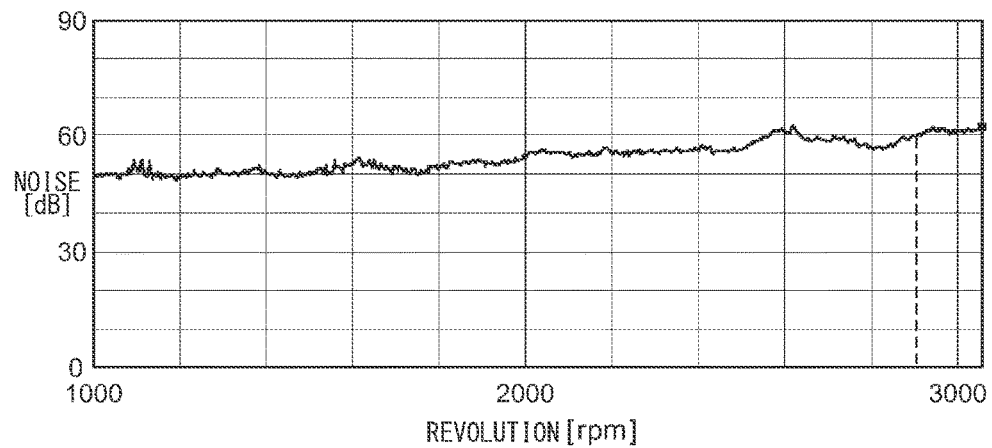
FIG. 11B shows a result of measuring the noise of a motor in which the rotor according to the embodiment is used.

FIG. 11A shows a result of measuring the noise of a motor in which the rotor according to the comparative example is used, and FIG. 11B shows a result of measuring the noise of a motor in which the rotor according to the embodiment is used. As shown in FIG. 11A, the noise of the motor according to the comparative example is 85 dB at the revolution of 3000 [rpm] and so is quite high. Meanwhile, the noise of the motor according to the embodiment is 60 dB near the revolution of 3000 [rpm] as shown in FIG. 11B, meaning that the rotor is rotated very quietly.

A detailed description will be given of the shapes of the teeth 40 and the rotor core 26 with reference to FIG. 7. The stator 14 includes a plurality of teeth 40 formed toward the center of the stator 14 so as to face the rotor. Given that the radius of curvature of the outer circumference of the rotor core 26 is R and the width of the end of the teeth 40 in the circumferential direction is W, it is preferable that 0.9≤R/W≤4.2 be met. Hereinafter, R/W is sometimes referred to as a form factor α.

Figure 12:
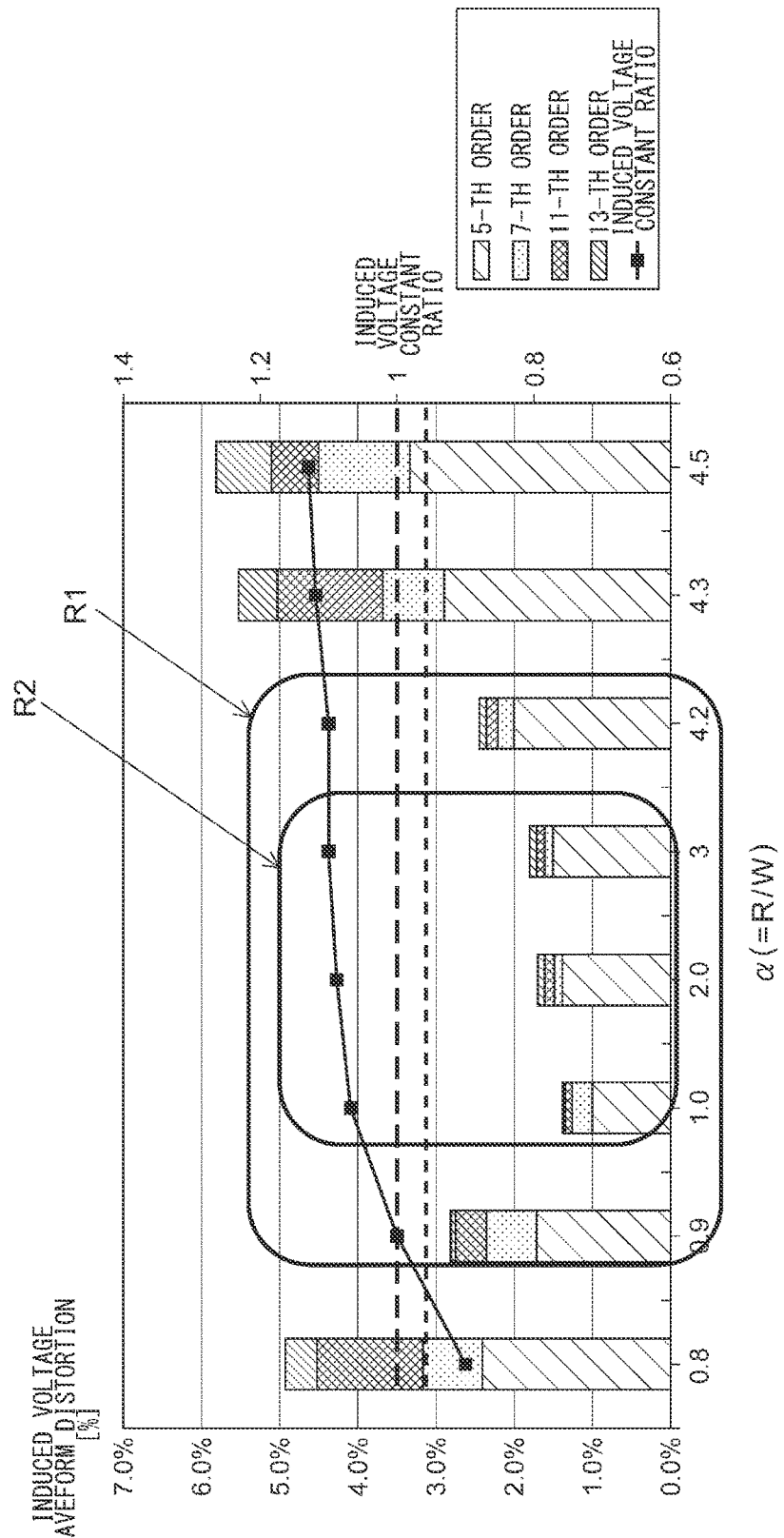
FIG. 12 is a graph showing the distortion component of the induced voltage waveform and the induced voltage constant ratio in the rotor obtained by varying the form factor $\alpha(=R/W)$ in a range 0.8-4.5.

FIG. 12 is a graph showing the distortion component of the induced voltage waveform and the induced voltage constant ratio in the rotor obtained by varying the form factor α(=R/W) in a range 0.8-4.5. The vertical axis on the left of FIG. 12 represents the proportion occupied by the component of each order in the whole order components from FFT analysis, and the vertical axis on the right of FIG. 12 represents the induced voltage constant ratio. Table 1 lists specific numerical values.

| | α = R/W | | | | | | | |
|---|---|---|---|---|---|---|---|---|
| | 0.8 | 0.9 | 1.0 | 2.0 | 3.0 | 4.2 | 4.3 | 4.5 |
| 5-TH ORDER | 2.40% | 1.70% | 1.00% | 1.38% | 1.50% | 1.60% | 2.90% | 3.34% |
| 7-TH ORDER | 0.77% | 0.65% | 0.26% | 0.11% | 0.11% | 0.15% | 0.77% | 1.16% |
| 11-TH ORDER | 1.35% | 0.40% | 0.08% | 0.11% | 0.11% | 0.11% | 1.35% | 0.61% |

-continued

| | α = R/W | | | | | | | |
|---|---|---|---|---|---|---|---|---|
| | 0.8 | 0.9 | 1.0 | 2.0 | 3.0 | 4.2 | 4.3 | 4.5 |
| 13-TH ORDER | 0.40% | 0.06% | 0.04% | 0.09% | 0.08% | 0.06% | 0.50% | 0.70% |
| INDUCED VOLTAGE CONSTANT RATIO | 0.9 | 1 | 1.07 | 1.09 | 1.1 | 1.1 | 1.12 | 1.13 |

Generally, the 5-th order, 7-th order, 11-th order, and 13-th order induced voltage waveform distortion is generated in the induced voltage waveform in a concentrated winding of a three-phase brushless motor. This causes the torque ripple of the motor to vary and generates abnormal noise. As shown in FIG. 12 and Table 1, the total of the 5-th order, 7-th order, 11-th order, and 13-order induced voltage waveform distortion exceeds 3.0% in the cases that the form factor α is 0.8, 4.3, or 4.5, which reveals that there is room for reduction of the abnormal noise caused by the torque ripple. Meanwhile, the total of the induced voltage waveform distortion is 3.0% if the form factor α is such that $0.9 \leq \alpha \leq 4.2$ (range R1 in FIG. 12). Thus, by reducing the 5-th order, 7-th order, 11-th order, and 13-th order distortion in the induced voltage waveform, the 6-th order and 12-order components of the current ripple are reduced and the torque ripple is reduced so that the rotor is rotated more quietly. Further, if the form factor α is 0.9 or higher, the induced voltage constant ratio is 1.0 or higher so that a high torque is produced. Thus, if the form factor α is such that $0.9 \leq \alpha \leq 4.2$, a motor with high torque and low abnormal noise is realized. More preferably, by configuring the form factor α such that $1.0 \leq \alpha \leq 3.0$ (range R2 in FIG. 12), the total of the induced voltage waveform distortion will be 2.0% or lower so that a motor with a high torque and lower abnormal noise is realized.

A detailed description will be given of the shapes of the rotor core 26 and the magnet 28 with reference to FIG. 7. As shown in FIG. 7, given that the maximum outer diameter of the rotor is L and the width of the plate-shaped magnet in the radial direction is Y, $0.37 \leq Y/(L/2) \leq 0.62$ is preferably met. Hereinafter, Y/(L/2) is sometimes referred to as a form factor β.

Figure 13:
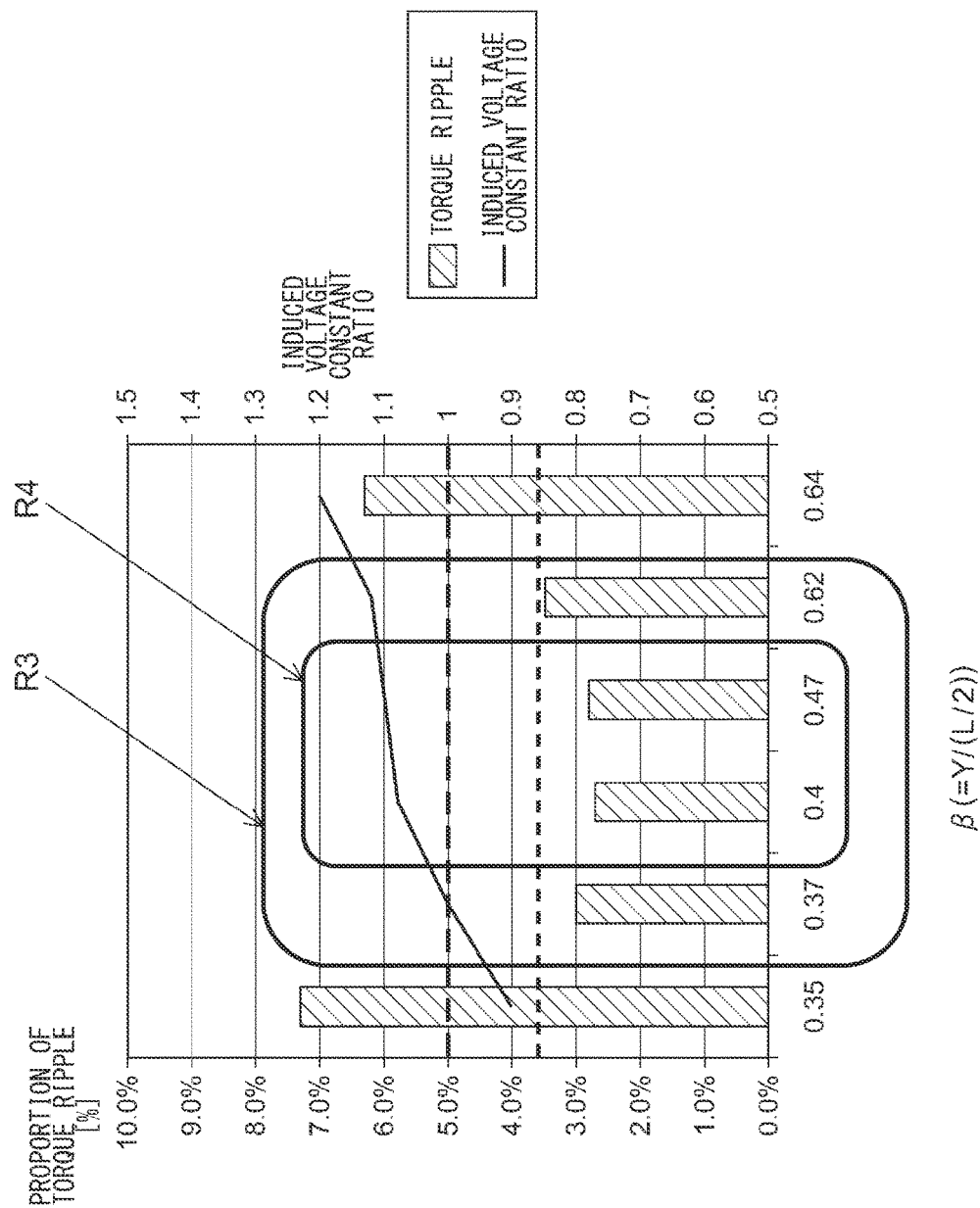
FIG. 13 is a graph showing the torque ripple and the induced voltage constant ratio in the rotor obtained by varying the form factor $\beta(=Y/(L/2))$ in a range 0.35-0.64.

FIG. 13 is a graph showing the torque ripple and the induced voltage constant ratio in the rotor obtained by varying the form factor $\beta(=Y/(L/2))$ in a range 0.35-0.64. The vertical axis on the left of FIG. 13 represents the proportion of the torque ripple and the vertical axis on the right of FIG. 13 represents the induced voltage constant ratio. Table 2 lists specific numerical values.

| | β = Y/(L/2) | | | | | |
|---|---|---|---|---|---|---|
| | 0.35 | 0.37 | 0.40 | 0.47 | 0.62 | 0.64 |
| INDUCED VOLTAGE CONSTANT RATIO | 0.9 | 1 | 1.08 | 1.1 | 1.12 | 1.2 |
| TORQUE RIPPLE | 5.0% | 3.0% | 2.7% | 2.8% | 3.5% | 6.3% |

As shown in FIG. 13 and Table 2, if the form factor β is in a range $0.37 \leq \beta \leq 0.62$ (range R2 in FIG. 13), the induced voltage constant ratio is 1.0 or higher and a high torque is maintained. Since the torque ripple is less than 3.5%, the motor is rotated smoothly and abnormal noise is reduced. Still preferably, if the form factor β is in a range $0.40 \leq \beta \leq 0.47$ (range R4 in FIG. 13), a high torque is maintained and the torque ripple is controlled to be less than 3.0% so that a motor in which generation of abnormal noise is further reduced is realized.

As described above, the torque ripple is reduced in the brushless motor according to the embodiment. Reduction (decrease) in the torque ripple leads to reduction of the force exerted on the magnetic pole pieces while the motor is being rotated. This can realize a rotor 12 capable of reducing the displacement of the magnetic pole piece 26d even if the mechanical strength with which the magnetic pole piece 26d in the rotor core 26 shown in FIGS. 4 and 5 is fixed to the annular part 26c is relatively decreased. This allows the magnetic path 26f to be thinner or longer. By thinning or extending the magnetic path 26f, the magnetic resistance is increased and it will be difficult for lines of magnetic force to pass through the magnetic path. As a result, a brushless motor can be realized in which the short circuit of the magnetic flux emanating from the magnet 28 is further restrained and the torque is increased.

A description will now be given of the specification of the brushless motor in which the embodiment can be suitably used. The outer diameter of the brushless motor according to the embodiment is about 30-140 mm and, preferably, about 35-85 mm. The number of grooves (teeth) of the stator is, for example, 12. It is preferable that the number of magnets be 10 or 14. The magnetic force (energy product) of the magnet is 8 MGOe or higher, and, preferably, 10 MGOe or higher, and, more preferably, 30 MGOe or higher. Further, the diameter of the rotor is preferably 20-70 mm. The width of the magnetic path described above is larger than the thickness of a single plate-shaped member forming the rotor core (about 0.35-0.5 mm). The gap between the rotor and the stator is 0.3 mm-1.5 mm, and, preferably, 0.4-0.65 mm. This prevents the torque from being reduced and reduces the torque ripple and noise at the same time.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

What is claimed is:

1. A brushless motor comprising:
   a rotor; and
   a stator including at its center a space for placing the rotor, wherein
   the rotor includes:
   a rotor core; and
   a plurality of magnets, wherein
   the rotor core includes a plurality of magnet holders radially formed around a rotating shaft,
   the magnets are housed in the magnet holders such that the same magnetic poles of adjacent magnets face each other in a circumferential direction of the rotor core, the stator includes a plurality of teeth formed toward the center to face the rotor, and given that a radius of curvature of an outer circumference of the rotor core is R, a width of an end of the teeth in a circumferential direction is W, and a maximum outer diameter of the rotor core is L, $0.9 \leq R/W \leq 4.2$ and $R<L/2$ are met.

2. The brushless motor according to claim 1, wherein given that a maximum outer diameter of the rotor is L and a width of the magnet in a radial direction is Y, $0.37 \leq Y/(L/2) \leq 0.62$ is met.

3. A brushless motor comprising:

a rotor; and a stator including at its center a space for placing the rotor, wherein the rotor includes:

a rotor core; and a plurality of magnets, wherein the rotor core includes a plurality of magnet holders radially formed around a rotating shaft, the magnets are housed in the magnet holders such that the same magnetic poles of adjacent magnets face each other in a circumferential direction of the rotor core, given that a maximum outer diameter of the rotor is L and a width of the magnet in a radial direction is Y, $0.37 \leq Y/(L/2) \leq 0.62$ is met.

4. The brushless motor according to claim 1, wherein a gap between the rotor and the stator is 0.3-1.5 mm.

5. The brushless motor according to claim 1, wherein the rotor core includes:

an annular part around a hole in which the rotating shaft is inserted;

a plurality of magnetic pole pieces radially formed around the annular part; and a plurality of first magnetic flux blocking parts formed outside the annular part and in respective areas between adjacent magnet holders, wherein the magnet holder includes a second magnetic flux blocking part at an end of the magnetic holder toward the rotating shaft, the magnets are housed in the magnet holders such that the same magnetic poles of adjacent magnets face each other in a circumferential direction of the rotor core, the first magnetic flux blocking part and the second magnetic flux blocking part are configured to restrain a short circuit, within the rotor core, of the magnetic flux emanating from the magnet, the rotor core includes two magnetic paths formed between the first magnetic flux blocking part and the two second magnetic flux blocking parts adjacent to the first magnetic flux blocking part, and the two magnetic paths branch in different directions toward the annular part from the end of the magnetic pole piece toward the rotating shaft.

6. The brushless motor according to claim 5, wherein the two magnetic paths are provided in linear symmetry with respect to the center line of the magnetic pole piece.

7. The brushless motor according to claim 5, wherein the first magnetic flux blocking part and the second magnetic flux blocking part are configured such that:

an angle α formed by a straight line L1 through a center of the magnetic path and a central line L2 of the magnetic pole piece is larger than 0°, and an angle β formed by the straight line L1 through the magnetic path and a plane P1 including an end face of the magnet toward the rotating shaft is larger than 10°.

8. The brushless motor according to claim 5, wherein the second magnetic flux blocking part is a through hole extending in the direction of the rotating shaft and is provided with a function of positioning the magnet in a radial direction, and a circumferential width of an area of the second magnetic flux blocking part adjacent to the magnet is smaller than a circumferential width of the magnet housed in the magnet holder.

9. The brushless motor according to claim 5, wherein the first magnetic flux blocking part is through hole extending in the direction of the rotating shaft.

10. The brushless motor according to claim 5, wherein an outer circumference of the magnetic pole piece is isolated from an adjacent magnetic pole piece.

11. The brushless motor according to claim 3, wherein the rotor core includes:

an annular part around a hole in which the rotating shaft is inserted;

a plurality of magnetic pole pieces radially formed around the annular part; and a plurality of first magnetic flux blocking parts formed outside the annular part and in respective areas between adjacent magnet holders, wherein the magnet holder includes a second magnetic flux blocking part at an end of the magnetic holder toward the rotating shaft, the magnets are housed in the magnet holders such that the same magnetic poles of adjacent magnets face each other in a circumferential direction of the rotor core, the first magnetic flux blocking part and the second magnetic flux blocking part are configured to restrain a short circuit, within the rotor core, of the magnetic flux emanating from the magnet, the rotor core includes two magnetic paths formed between the first magnetic flux blocking part and the two second magnetic flux blocking parts adjacent to the first magnetic flux blocking part, and the two magnetic paths branch in different directions toward the annular part from the end of the magnetic pole piece toward the rotating shaft.

12. The brushless motor according to claim 11, wherein the two magnetic paths are provided in linear symmetry with respect to the center line of the magnetic pole piece.

13. The brushless motor according to claim 11, wherein the first magnetic flux blocking part and the second magnetic flux blocking part are configured such that:

an angle α formed by a straight line L1 through a center of the magnetic path and a central line L2 of the magnetic pole piece is larger than 0°, and an angle β formed by the straight line L1 through the magnetic path and a plane P1 including an end face of the magnet toward the rotating shaft is larger than 10°.

14. The brushless motor according to claim 11, wherein the second magnetic flux blocking part is a through hole extending in the direction of the rotating shaft and is provided with a function of positioning the magnet in a radial direction, and a circumferential width of an area of the second magnetic flux blocking part adjacent to the magnet is smaller than a circumferential width of the magnet housed in the magnet holder.

15. The brushless motor according to claim 11, wherein the first magnetic flux blocking part is through hole extending in the direction of the rotating shaft.

16. The brushless motor according to claim 11, wherein an outer circumference of the magnetic pole piece is isolated from an adjacent magnetic pole piece.

* * * * *